Aug. 10, 1937.  W. O. WHEELER  2,089,315
CLOSED GRILL FOR TOASTERS
Filed June 18, 1936
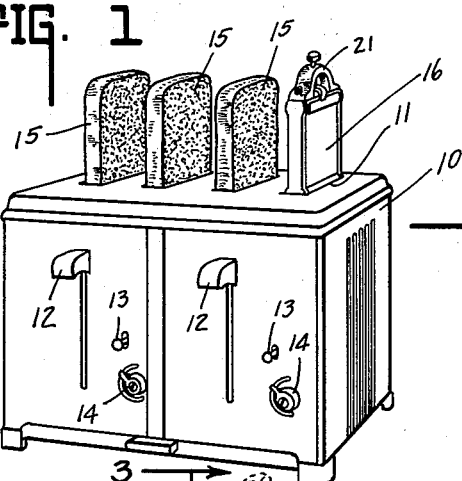
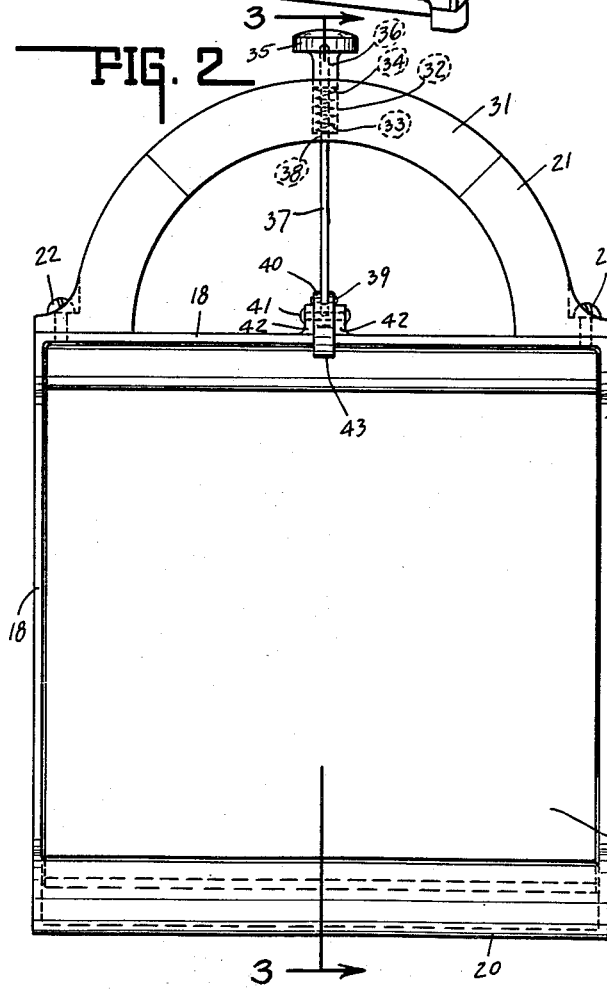
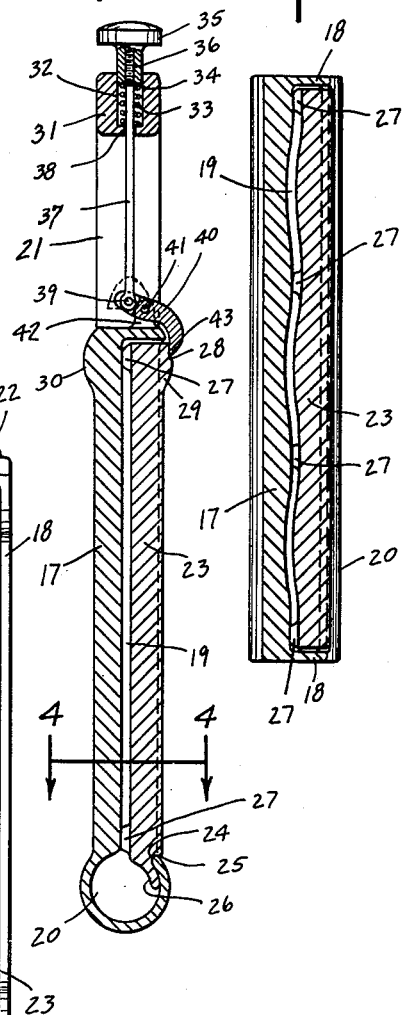
INVENTOR.
WILLIAM O. WHEELER.
BY
Lockwood Goldsmith & Galt
ATTORNEYS.

Patented Aug. 10, 1937

2,089,315

UNITED STATES PATENT OFFICE 2,089,315

CLOSED GRILL FOR TOASTERS

William Oliver Wheeler, Indianapolis, Ind.

Application June 18, 1936, Serial No. 86,018

7 Claims. (Cl. 53—5)

This invention relates to a grill device and the form of the invention is illustrated as applied to the grilling of bacon, although the broader features of the invention are not restricted thereto.

One object of the invention is to grill food for sandwich purposes without the consumption of any additional power or energy in many cases.

Another object of the invention is to permit the formation of the various ingredients in the sandwich at the same station at which the sandwich is constructed or put up.

The chief feature of the invention is, when adapted for frying of bacon, that the danger of grease fires is practically eliminated.

The full nature of the invention will be understood from the accompanying drawing and the following description and claims:

In the drawing, Fig. 1 is a perspective view of a well known type of electric toaster, and illustrating the invention and three pieces of toast associated therewith.

Fig. 2 is an enlarged side elevation of a grill.

Fig. 3 is a central sectional view of the grill taken on line 3—3 of Fig. 2 and in the direction of the arrows.

Fig. 4 is a transverse sectional view taken on line 4—4 of Fig. 3 and in the direction of the arrows.

In the drawing 10 indicates a toaster of electrical character, although the invention is not necessarily restricted in its application to an electric toaster. The toaster is of the dual unit type, each unit including two bread slice receiving slots 11 and each unit being controlled by the operating lever 12, the switch 13 and the temperature control device 14. Thus, a pair of toasting wells is simultaneously controlled.

The second unit is similarly controlled and the two are combined into one toasting device. Herein three pieces of toast 15 are represented as having been completed and the grill device is indicated by the numeral 16.

It will be apparent that with a double unit toaster, there are four toasting slots or wells and only three are utilized for toast formation when a three-decker sandwich is to be made. The other available toasting slot is utilized by the inclusion of the grill, indicated by the numeral 16 in Fig. 1, and without the expenditure of any additional power over that required to produce the three slices of toast.

The grill shown more particularly in Figs. 2, 3 and 4, includes a main plate or cover portion 17 having a rim engagement 18 on four sides forming a chamber 19. The chamber 19 terminates in an enlargement 20 which is a grease well or reservoir. An arcuate handle 21 is suitably secured as at 22 to the plate 17 and serves as the medium for positioning the grill.

A cover plate 23 has a detachable hinge type connection 24 with the grease well and rim forming portion 25, the plate 23 having the tongue 26 for operative connection therewith. The plate 23 includes the spaced lugs 27 at the top and bottom which serve as spacers so as to form the chamber 19 of a predetermined thickness.

As shown in Fig. 4, the chamber 19 may have a sinuous cross sectional outline so that the bacon included between the two plates 17 and 23 is caused to assume the curvature of the chamber 19 and thus have a more attractive appearance. Vegetable parchment paper or the like may enclose the bacon, if, as and when desired. The upper end of the plate 23 includes a groove portion 28 in an enlargement 29 and opposite thereto is an enlargement 30 on the plate 17. The grease well portion 20 forms a lower enlargement. The enlargements 30, 29 and 20 center the grill device in the bread slot of the toaster.

The handle portion 21 includes an intermediate heat insulated portion 31 and the same is recessed as at 32 to receive a coil spring 33 bearing against the end 34 of a finger piece 35 exposed relative to the handle portion 31. The finger piece 35 of heat insulating material has a threaded connection 36 with the rod or link member 37 that extends through the recess 33 and through the opening 38 aligned therewith. The opposite end of the member 37 is pivotally connected at 39 to the catch member 40 pivotally supported at 41 in the ears 42.

Catch member 40 includes a latching portion 43 and the said portion engages in the groove 28 formed in the enlargement 29. The weight of the portion 43 as well as the spring 33 normally retains the latching member in latching position and thereby retains the plate 23 in closed position.

The bacon, for example, may be included within vegetable parchment paper and positioned in the curved grooves 19 and then the device closed and inserted bodily into a toasting slot in the toaster 10. After the proper interval, the grill is ejected in the same manner that a slice of toast is ejected.

During the toasting operation, to prevent fires and the like, the grease, which is rendered from the bacon, drains downwardly and into the reservoir 20. After the grill has been ejected following grilling of the bacon, plate 23 is removed, the bacon applied to the sandwich and the grease is then poured from the reservoir 20. The detachable association between the two plates 17 and 23 permits of sanitary cleaning of both.

It has been found that aluminum plates in the form of castings, are highly satisfactory. It has also been determined that cheese may be toasted by including the same within vegetable parchment paper, and the like. It also has been determined that other meats, such as chicken, tongue, et cetera, may be heated. Thus, a truly hot sandwich may be dispensed since the filling, such as bacon, chicken, tongue, cheese, or the like, will be heated simultaneously with the formation of the toast.

While the invention has been described in great detail in the foregoing specification and illustrated in similar detail in the drawing, the same is to be considered illustrative and not restrictive in character. The various modifications mentioned hereinbefore and others which will readily suggest themselves to those skilled in this art, are all considered to be within the broad scope of the invention, reference being had to the appended claims.

The invention claimed is:—

1. A grill for products of the character described including a pair of matched heat transmitting covers providing a relatively thin grilling chamber therebetween, handle means, said covers having an interfitting peripheral connection whereby one cover is nested relative to the other cover, and a latch for locking the covers together.

2. A grill for products of the character described including a pair of matched heat transmitting covers providing a relatively thin grilling chamber therebetween, handle means, a latch for locking the covers together, and release means carried by the handle and normally constrained toward latching position and operatively associated with the latch for maintaining same in cover locking position.

3. A grill for products of the character described including a plate structure having a peripheral frame arrangement, another plate structure nestable within the rim arrangement and hingedly associated therewith, means spacing the two plate structures in spaced relation for forming a heating chamber therebetween, said plates being of heat transmitting material, handle means carried by one plate structure, and latch means normally locking the plate structures together.

4. A grill for products of the character described including a plate structure having a peripheral frame arrangement, another plate structure nestable within the rim arrangement and hingedly associated therewith, means spacing the two plate structures in spaced relation for forming a heating chamber therebetween, said plates being of heat transmitting material, the rim arrangement at one side being enlarged and interiorly recessed, the recess communicating with the heating chamber to form a grease well or the like, handle means for the grill, and latch means for locking the plate structures together.

5. A grill for products of the character described including a plate structure having a peripheral frame arrangement, another plate structure nestable within the rim arrangement and hingedly associated therewith, means spacing the two plate structures in spaced relation for forming a heating chamber therebetween, said plates being of heat transmitting material, the adjacent heating surfaces, forming the heating chamber in the adjacent plate structures having a curved arrangement substantially as and for the purpose described, handle means for the grill, and latch means for locking the plate structures together.

6. A grill for products of the character described including a plate structure having a peripheral frame arrangement, another plate structure nestable within the rim arrangement and hingedly associated therewith, means spacing the two plate structures in spaced relation for forming a heating chamber therebetween, said plates being of heat transmitting material, the hinge connection between the two plate structures being of separable character, and handle means for the grill, and latch means normally constrained to lock the plate structures together.

7. In combination with a toaster having a bread slice receiving slot, and means controlling the application of heat to the bread slice in the slot and operable for the removal of the finished toast from the slot, of a grill having a handle portion and a grilling portion, the latter conforming to slot conformation and receivable by the slot for subjection to heating and manipulation substantially as set forth for toasting, the grill being adapted for the grilling of bacon or the like from which a liquid is discharged, said grill including a liquid receiving reservoir at the base thereof for collection and entrapment of the liquid for safety purposes.

WILLIAM OLIVER WHEELER.